(12) United States Patent
Inagaki et al.

(10) Patent No.: US 11,385,522 B2
(45) Date of Patent: Jul. 12, 2022

(54) ISING MODEL CALCULATION DEVICE

(71) Applicant: Nippon Telegraph and Telephone Corporation, Tokyo (JP)

(72) Inventors: Takahiro Inagaki, Atsugi (JP); Hiroki Takesue, Atsugi (JP); Toshimori Honjo, Atsugi (JP); Kensuke Inaba, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 396 days.

(21) Appl. No.: 16/634,650

(22) PCT Filed: Oct. 19, 2018

(86) PCT No.: PCT/JP2018/038994
§ 371 (c)(1),
(2) Date: Jan. 28, 2020

(87) PCT Pub. No.: WO2019/078354
PCT Pub. Date: Apr. 25, 2019

(65) Prior Publication Data
US 2021/0088873 A1    Mar. 25, 2021

(30) Foreign Application Priority Data
Oct. 19, 2017 (JP) .............................. JP2017-202987

(51) Int. Cl.
*G02F 1/39* (2006.01)
*G06E 3/00* (2006.01)

(52) U.S. Cl.
CPC ............. *G02F 1/392* (2021.01); *G06E 3/008* (2013.01)

(58) Field of Classification Search
CPC ..................................................... G06E 3/008
See application file for complete search history.

(56) References Cited

U.S. PATENT DOCUMENTS 10,139,703 B2 * 11/2018 Inagaki .................. G06N 5/003
10,140,580 B2 * 11/2018 Utsunomiya ............ G06N 5/02
(Continued)

FOREIGN PATENT DOCUMENTS

WO     2015/156126 A1    10/2015

OTHER PUBLICATIONS

H. Takesue, T. Inagaki, K. Inaba and T. Honjo, "Solving large-scale optimization problems with coherent Ising machine," 2017 Conference on Lasers and Electro-Optics Pacific Rim (CLEO-PR), 2017, pp. 1-2, doi: 10.1109/CLEOPR.2017.8118781. (Year: 2017).*

(Continued)

*Primary Examiner* — Rhonda S Peace
(74) *Attorney, Agent, or Firm* — Workman Nydegger

(57) ABSTRACT

The Ising model calculation device selects a solution having a consistent quality from among solutions obtained through the calculations with the evaluation index of a calculation accuracy. A coupling coefficient obtained by combining the Ising model coupling coefficient corresponding to a problem for which a solution should be calculated with the Ising model coupling coefficient corresponding to the check problem is set as a coupling coefficient used to calculate the interaction. With regard to a calculation value corresponding to the check spin among the calculation values using a plurality of light pulses, the compatibility as the solution of the check problem is judged. When the judgement result shows the compatibility as the solution of the check problem, a calculation value other than the calculation values corresponding to the check spin among the resultant calculation values is outputted as a solution to the problem for which a solution should be calculated.

5 Claims, 12 Drawing Sheets

(56) References Cited

U.S. PATENT DOCUMENTS

2017/0024658 A1 1/2017 Utsunomiya et al.
2021/0088873 A1* 3/2021 Inagaki .................. G06E 3/001

OTHER PUBLICATIONS

T. Honjo, T. Inagaki, K. Inaba, T. Ikuta and H. Takesue, "Long-Term Stable Operation of Coherent Ising Machine for Cloud Service," 2018 Conference on Lasers and Electro-Optics (CLEO), 2018, pp. 1-2. (Year: 2018).*
H. Takesue, et al., "Simulating One- and Two-Dimensional Ising Models in a Magnetic Field Using a Coherent Ising Machine," in Conference on Lasers and Electro-Optics, OSA Technical Digest (Optica Publishing Group, 2020), paper JTu2F.15. (Year: 2020).*
International Search Report dated Dec. 11, 2018, issued in PCT Application No. PCT/JP2018/038994, filed Oct. 19, 2018.
Takahiro Inagaki et al., *A Coherent Ising Machine for 2000-node Optimization Problems*, Science, Nov. 4, 2016, vol. 354, No. 6312, pp. 603-607.

* cited by examiner

ISING MODEL CALCULATION DEVICE

TECHNICAL FIELD

The present invention relates to an Ising model calculation device that is based on the pseudo simulation of an Ising model by light pulses,

BACKGROUND ART

A Neumann-type computer, which has been conventionally well known, cannot efficiently solve a combinational optimization problem classified as an NP problem. Methods suggested to solve the combinational optimization problem include a method using an Ising model. The Ising model is a lattice model obtained by statistically analyzing magnetic material as the interaction of spins provided at the respective sites of lattice points.

The energy function of the Ising model system is represented by the Hamiltonian H as shown in the following formula (1).

Formula 1

$$H = \Sigma_{i,j} J_{ij} \sigma_i \sigma_j \quad (1)$$

In this formula, $J_{ij}$ shows a coupling constant that shows the correlation among the respective sites constituting the Ising model, and $\sigma_i$ and $\sigma_j$ show the spins of the respective sites that have a value 1 or −1.

When a combinational optimization problem is solved using the Ising model, an optimal solution is obtained by calculating, where $J_{ij}$ is provided that shows the correlation among the respective sites in the Hamiltonian of the above Ising model, the value $\sigma_i$ at which the energy H has the lowest value provided by the system in a stable state. In recent years, such calculation device that can provide the pseudo simulation of the Ising model using light pulses as described above to thereby solve a combinational optimization problem such as the NP problem has been a focus of attention (Patent Literature 1, Non-patent Literature 1).

FIG. 1 illustrates the basic configuration of the Ising model calculation device. As shown in FIG. 1, the Ising model calculation device is configured so that a pump light pulse (pump) is injected to a phase sensitive amplifier (PSA) 2 provided in ring-like optical fibers functioning as a ring resonator 1 to thereby generate light pulse trains in a quantity corresponding to the number of the sites of the Ising model. This configuration is a binarized OPO (Optical Parametric Oscillator) which is 0 or π phase optical parametric oscillator. When a light pulse train inputted to the ring resonator 1 moves around within the ring resonator 1 and returns to the PSA 2, pump light is inputted to the PSA 2 again to thereby amplify the light pulse train. The light pulse train generated by the injection of the first pump light is a weak pulse having an unstable phase. Whenever the light pulse train moves around within the ring resonator 1, the light pulse train is amplified by the PSA 2 so that the phase state is gradually stable. The PSA 2 amplifies each light pulse with a 0 or π phase relative to the phase of a pump light source and thus the phase state is stabilized at any of these phase states.

The Ising model calculation device is configured so that the spins 1 and −1 in the Ising model correspond to the light pulse phases 0 and π. Whenever the light pulse train moves around within the ring resonator 1, a measurement unit 3 provided at the exterior of the ring resonator 1 measures the phase and the amplitude of the light pulse train. These measurement results are inputted to a calculator 4 provided with a coupling coefficient $J_{ij}$ in advance and are used to calculate a coupling signal to the ith pulse (a signal as a feedback input), $$\sum_j J_{ij} c_j \quad \text{Formula 2}$$

Where $c_j$ is the amplitude of the light pulse of the jth site. This coupling coefficient $J_{ij}$ provided in advance is a problem to be calculated. Furthermore, an external light pulse depending on a coupling signal calculated by an external light pulse input unit 5 can be generated to input the result to the ring resonator 1 as a feedback loop control to thereby provide a correlation among the phases of the respective light pulses constituting the light pulse train.

The Ising model calculation device can calculate a solution of an Ising model by allowing a light pulse train to circle within the ring resonator 1 while being amplified so that the above-described correlation is given thereto, and measuring the phases 0 and π of the respective light pulses constituting light pulse train when a stable state is achieved.

CITATION LIST

Patent Literature

Patent Literature 1—International Publication No. 2015/156126, pamphlet

Non-Patent Literature

Non-patent Literature 1—T. Inagaki, Y. Haribara, et al, "A coherent Ising machine for 2000-node optimization problems," Science 354, 603-606 (2016).

SUMMARY OF INVENTION

Technical Problem

In the case of the Ising model calculation device using the light pulse train as described above, each of amplified light to an optical resonator, measurement local light, and feedback injection light must be light-coupled so as to have a phase matching the respective light pulses constituting the light pulse train.

However, a change in an optical path length caused by a temperature change of optical fibers constituting the ring resonator for example undesirably causes the light pulse train to have an unstable light phase, which causes a difficulty in the phase matching for the light coupling. This unstable light phase may cause a phase shift during the coupling, which undesirably may cause a case where a problem different from a problem for which a solution should be calculated is calculated erroneously. For example, if a problem is calculated while inverted interferences are being caused by a phase shift, the problem is undesirably solved with inverted symbols. As described above, the unstable light phase causes a possibility where every optimization problem has a different calculation accuracy. Thus, it is important for the Ising model calculation device using the light pulse train to maintain the quality of a solution outputted therethrough. At the same time, the calculation accuracy must be set independent from a problem inputted to the Ising model calculation device because a solution of the problem inputted to the device cannot be predicted in advance.

The present invention has been made in view of the above conventional problem. The objective is to provide an Ising model calculation device according to which the Ising model calculation device has a calculation accuracy evaluation index independent from a problem inputted thereto so that a solution having a consistent quality can be selected from among calculated solutions to output the selected solution.

Solution to Problem

In order to solve the above disadvantage, the invention according to one embodiment provides an Ising model calculation device including a resonator unit for amplifying a plurality of light pulses and a feedback configuration for measuring phases and amplitudes of the plurality of light pulses to calculate the interaction related to a light pulse using an Ising model coupling coefficient to send a feedback. The Ising model calculation device further include a check spin introduction unit for using a part of the plurality of light pulses as a check spin to solve a check problem to examine the calculation accuracy. The check spin introduction unit is configured to: set a coupling coefficient obtained by combining the Ising model coupling coefficient corresponding to a problem for which a solution should be calculated with the Ising model coupling coefficient corresponding to the check problem as a coupling coefficient used to calculate the interaction; judge, with regard to a calculation value corresponding to the check spin among calculation values calculated using the plurality of light pulses, the compatibility of the solution of the check problem; output, when the judgement result shows that the calculation value is compatible as a solution of the check problem, a calculation value other than the calculation values corresponding to the check spin among the resultant calculation values as a solution to the problem for which a solution should be calculated; and set, when the judgement result shows that the calculation value is not compatible as a solution of the check problem, the combined coupling coefficient again as a coupling coefficient used to calculate the interaction to perform the calculation.

DESCRIPTION OF EMBODIMENTS

The following section will describe an embodiment of the present invention in detail.

The Ising model calculation device of this embodiment can calculate problems mapped on an Ising model by substituting the Ising model spin directions $\sigma_i$ and $\sigma_j(\pm 1)$ represented by the Hamiltonian of the following formula (1) with the light pulse phase (0, $\pi$) (or by performing the pseudo simulation).

Formula 3

$$H=\Sigma_{i,j}J_{ij}\sigma_i\sigma_j \quad (1)$$

Figure 1:
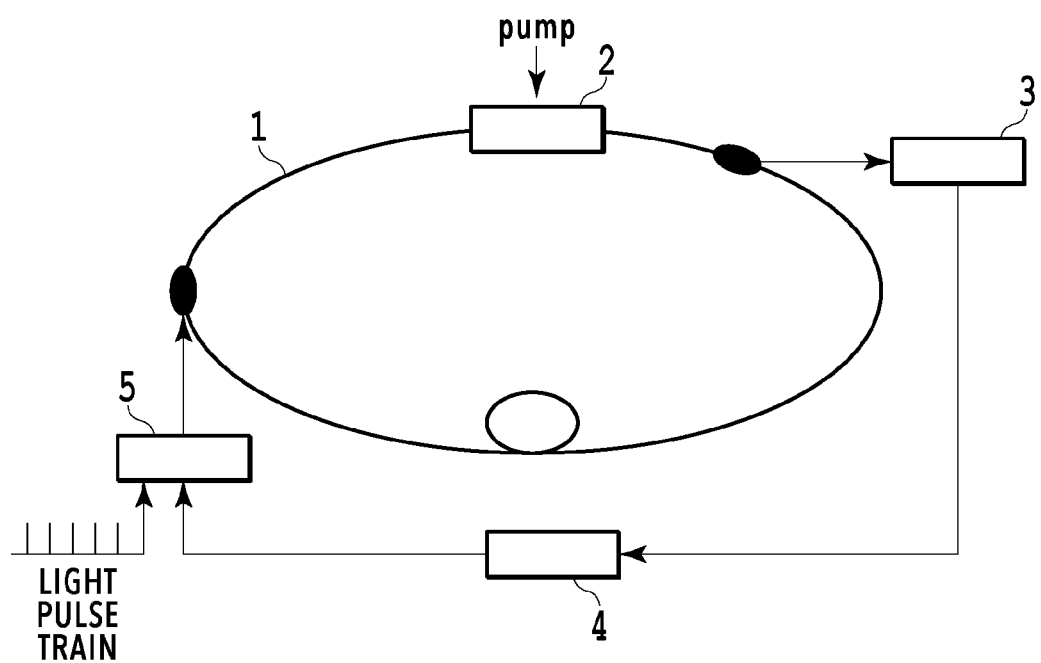
FIG. 1 illustrates a basic configuration of a conventional Ising model calculation device.
Figure 2:
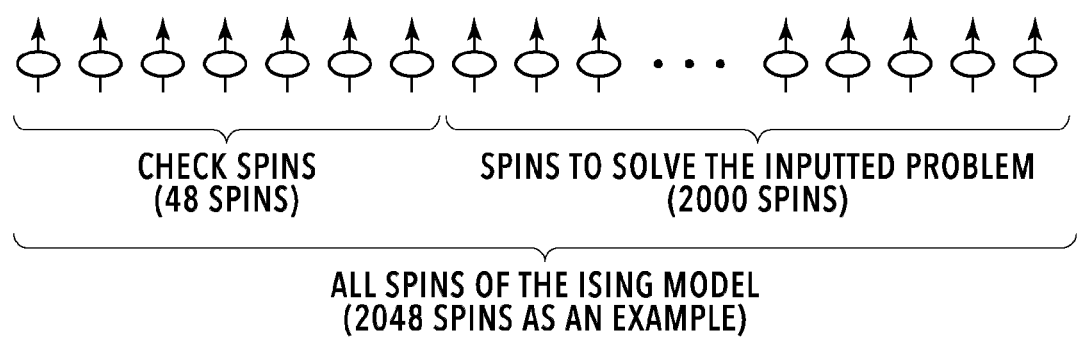
FIG. 2 illustrates check spins.

FIG. 2 illustrates the check spins used to examine the calculation accuracy. As shown in FIG. 2, according to the Ising model calculation device of this embodiment, all spins used for the calculation by the Ising model calculation device (all light pulses corresponding to the sites of the Ising model and constituting a light pulse train) are composed of spins used to solve a problem for which a solution should be calculated and check spins used to check the calculation accuracy of the Ising model calculation device. The term "check spin" means a spin (light pulse) used to actually solve a check problem for which the solution is already found.

Figure 3:
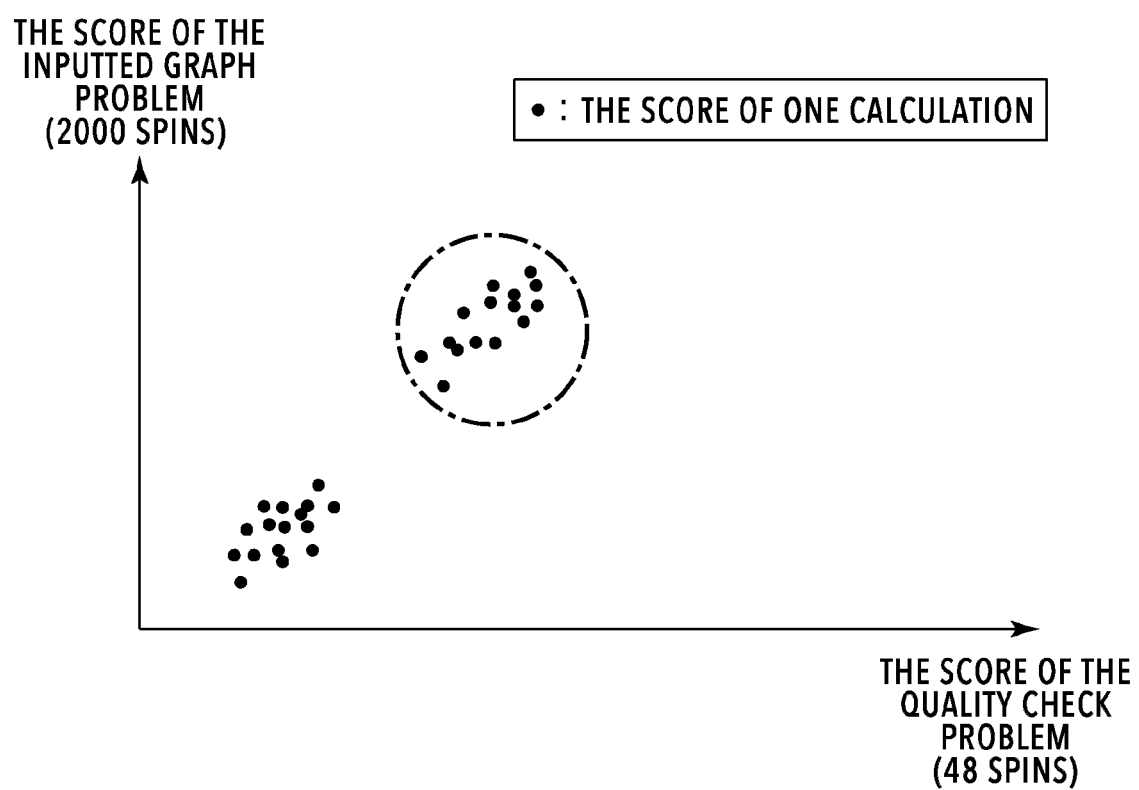
FIG. 3 illustrates the correlation between check problem scores and the scores of inputted graph problems.

FIG. 3 illustrates the correlation between a check problem score and a score of an inputted graph problem. According to FIG. 3, there is a positive correlation at a certain level between the check problem score (solution accuracy) and the score of the inputted graph problem (a problem for which a solution should be calculated). By selecting the calculation result of a region surrounded by the dashed line in which high scores exist only, the result having a high calculation accuracy can be extracted without depending on the structure of the inputted graph problem. Thus, by judging whether the solution using check spins has an accuracy (rightness) at a fixed level or more, a solution having a consistent quality can be selected from among calculated solutions to output the selected solution.

In order to examine the calculation precision, the Ising model calculation device of this embodiment uses a light pulse of a part of a plurality of light pulses available for the calculation as a check spin to solve a check problem for which the solution is known. The Ising model calculation device is configured to compare the known solution with one of calculation values (solutions) obtained through an actual calculation that correspond to the check spin, thereby evaluate the accuracy of the actually-obtained solution and select only the one having a fixed quality or more to output the selected one.

Figure 4:
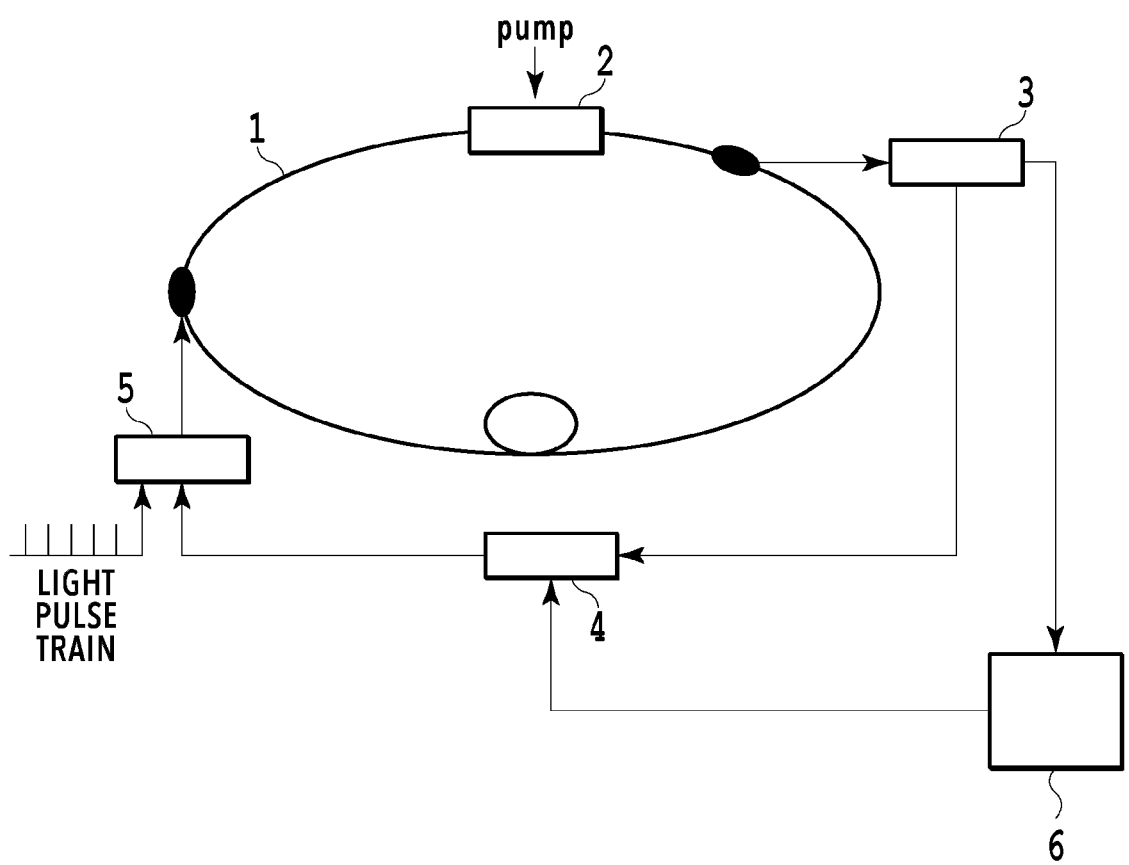
FIG. 4 is a schematic view illustrating an Ising model calculation device of this embodiment.

FIG. 4 is a schematic view illustrating the configuration of the Ising model calculation device of this embodiment. In FIG. 4, the Ising model calculation device includes: the ring resonator 1 composed of ring-like optical fibers; the PSA (phase sensitive amplifier) 2 provided in the ring resonator 1; the measurement unit 3, the calculator 4 and the external light pulse input unit 5 constituting a feedback loop. The Ising model calculation device further includes a solution quality retention unit (check spin introduction unit) 6 that is used to introduce a check spin at the exterior of the feedback loop between the measurement unit 3 and the calculator 4.

The PSA 2 efficiently amplifies a light with a phase 0 or π relative to a pump light source (more particularly the local light used to generate a pump light pulse) in a train of a plurality of light pulses pseudoly corresponding to a plurality of spins of the Ising model and having the same oscillatory frequency (light pulse train). The PSA 2 can be configured by nonlinear optical crystal such as PPLN (periodically poled lithium niobate) showing a second-order nonlinear optical effect for example.

When the PSA 2 receives signal light and pump light (excitation light), the PSA 2 generates a weak pulse (idler light) having a phase 0 or π relative to the phase of the pump light source. Even when the PSA 2 receives a pump light only with no signal light being generated, the PSA 2 can generate a weak pulse as amplified spontaneous emission (ASE) light.

When the PSA 2 receives pump light obtained by allowing a second harmonic generator to convert the local oscillation light (LO light) having a frequency ω to a frequency 2ω as a second order harmonic, weak noise light caused by a parametric down conversion process (when there has been no pump light and the PSA 2 receives the pump light for the first time) is generated. Furthermore, when the PSA 2 receives a light pulse train having moved around within the ring resonator 1 again, this light pulse train functions as a signal light as shown below.

$$E_s = A_s e^{i(\omega_s t + \theta_s)} \qquad \text{Formula 4}$$

When pump light completely phase-matched with this signal light is further inputted to the PSA 2, $$E_p = A_p e^{i\omega_p t} \qquad \text{Formula 5}$$

the idler light functioning as a phase conjugate wave of the signal light Es is generated by OPO (light parametric oscillation) providing a second-order nonlinear optical effect.

$$E_i = A_i e^{i\{(\omega_p - \omega_s)t - \theta_s\}} \qquad \text{Formula 6}$$

When the signal light and the idler light have matched frequencies, the following degenerate wave is outputted.

$$E_s = A_s e^{i(\omega_s t + \theta_s)} + A_s e^{i(\omega_s t - \theta_s)} = 2A_s e^{i\omega_s t} \cos \theta_s \qquad \text{Formula 7}$$

This outputted degenerate wave is obtained by superposing the signal light and the idler light phase conjugate to each other, thus providing the efficient amplification of a wave having a phase 0 or π. In this manner, the PSA 2 amplifies a phase component 0 or π of the firstly-generated weak light pulse train.

The ring resonator 1 allows the circular propagation of a plurality of light pulses (light pulse train) generated in the PSA 2. The ring resonator 1 can be configured by ring-like optical fibers. The optical fibers have a length obtained by multiplying the result of (the number of pulses constituting a light pulse train)×(pulse interval) with a length corresponding to the time required for the feedback processing.

The measurement unit 3 functions as a light pulse measurement unit that measures, whenever a plurality of light pulses (a light pulse train) move around within the ring resonator 1 (per one circle), the phases and the amplitudes of the plurality of light pulses. Specifically, the measurement unit 3 divides the light pulse train propagating within the ring resonator 1 to subject the phase state including the amplitude to a coherent measurement. The measurement unit 3 may be a known means to measure the phases and the amplitudes of a plurality of light pulses and may be configured by a balanced homodyne detector for example. The coherent measurement can be performed by using a balanced homodyne detector to measure the amplitude and the phase of a light pulse train inputted as a to-be-measured light for example.

Figure 5:
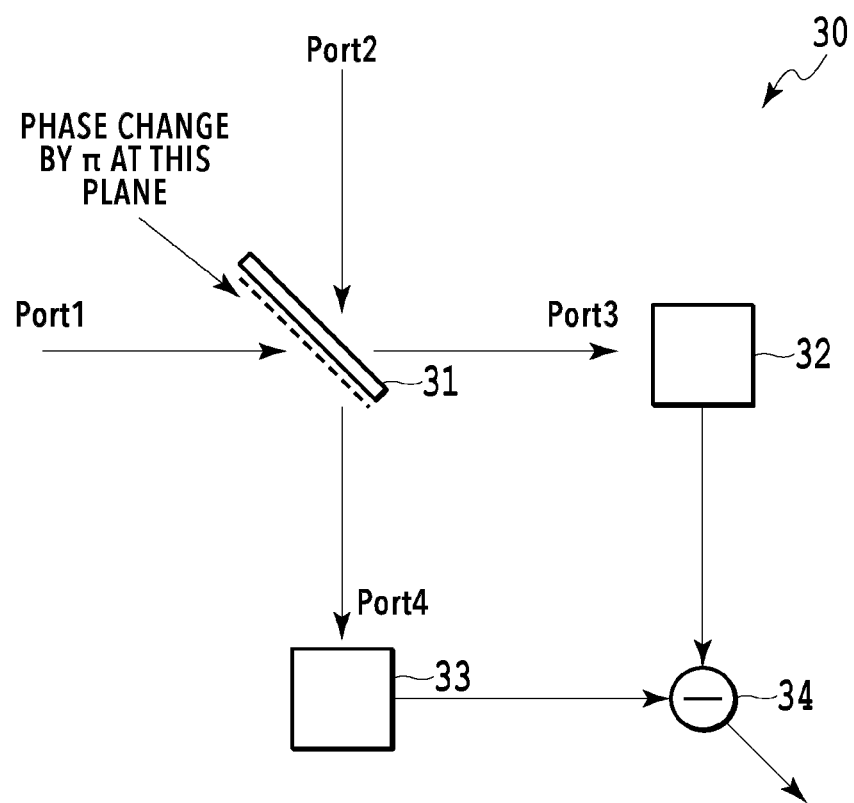
FIG. 5 illustrates a configuration example of a balanced homodyne detector.

FIG. 5 illustrates the configuration example of a balanced homodyne detector 30. The balanced homodyne detector 30 can cause interference with light constituting the light pulse train and phase-synchronized light having the same frequency as that of a to-be-measured light pulse train as reference light and measure the amplitude and the phase state of interference light. The balanced homodyne detector 30 has: a half mirror 31 to cause interference with the light from a port 1 and a port 2 to output the interference light to a port 3 and a port 4; the first photodetector 32 for detecting light outputted from the port 3; the second photodetector 33 for detecting light outputted from the port 4; and a difference calculator 34 for calculating the difference between the detection results from the first and second photodetectors 32 and 33.

The port 1 receives a light pulse train $E_s e^{i(\omega t + \theta)}$ as to-be-measured light. The port 2 receives reference light $E_{Lo} e^{i\omega t}$ for which the amplitude and phase are known. The light pulse train inputted through the port 1 is divided by the half mirror 31 to a component that has the same phase and that is transmitted toward the port 3 and a component that has a phase changed by π and that is reflected toward the port 4. The reference light inputted through the port 2 is divided by the half mirror 31 to a component that has the same phase and that is transmitted toward the port 4 and a component that has the same phase and that is reflected toward the port 3.

The output light obtained by the interference of the same phase component of the light pulse train inputted through the port 1 and the same phase component of the reference light inputted through the port 2 as shown below is as shown below $$E_3 = \frac{E_{LO}}{\sqrt{2}} e^{i\omega t} + \frac{E_S}{\sqrt{2}} e^{i(\omega t + \theta)} \qquad \text{[Formula 8]}$$

and is outputted from the port 3. The first photodetector 32 detects an electric signal showing the following optical intensity.

$$|E_3|^2 = \frac{E_{LO}^2 + E_S^2}{2} + E_{LO} E_S \cos \theta \qquad \text{Formula 9}$$

The output obtained by the interference of the opposite phase component of the light pulse train inputted from the port 1 and the same phase component of the reference light inputted from the port 2 as shown below is $$E_4 = \frac{E_{LO}}{\sqrt{2}} e^{i\omega t} - \frac{E_S}{\sqrt{2}} e^{i(\omega t + \theta)} \qquad \text{[Formula 10]}$$

and is outputted from the port 4. The second photodetector 33 detects an electric signal represented by the following optical intensity.

$$|E_4|^2 = \frac{E_{LO}^2 + E_S^2}{2} - E_{LO}E_S \cos\theta \qquad \text{Formula 11}$$

Furthermore, the difference calculator 34 calculates a difference between the detection signal of the first photodetector 32 and the detection signal of the second photodetector 33 to output $2E_{Lo}E_s \cos\theta$.

Thus, since the amplitude $E_{Lo}$ of the reference light is known, the resultant measurement result provides a value $\pm E$ including the cos component of the phase (only a symbol) and the amplitude.

The measurement result shows the signed analog value ($\pm E$) for which the symbol ($\pm$) shows the phase and the analog value (E) shows the amplitude.

Returning to FIG. 4, the calculator 4 receives the phase and the amplitude of the measured light pulse as an input to determine a light pulse-related interaction based on a coupling coefficient mapped on the Ising model and the phases and the amplitudes of other light pulses. The calculator 4 functions as an interaction calculator that calculates the phase and the amplitude of the light pulse after the interaction (the interaction coupling result) as a feedback value. The calculator 4 can be a digital calculator such as FPGA for example.

Specifically, the calculator 4 firstly subjects the amplitude and the phase of the light pulse train measured by the measurement unit 3 to the calculation with a coupling coefficient based on the formula (2), thereby determining the interaction.

Formula 12

$$\begin{pmatrix} f_1 \\ f_2 \\ f_3 \\ f_4 \\ f_5 \end{pmatrix} = \begin{pmatrix} 0 & J_{12} & J_{13} & J_{14} & J_{15} \\ J_{21} & 0 & J_{23} & J_{24} & J_{25} \\ J_{31} & J_{32} & 0 & J_{34} & J_{35} \\ J_{41} & J_{42} & J_{43} & 0 & J_{45} \\ J_{51} & J_{52} & J_{53} & J_{54} & 0 \end{pmatrix} \begin{pmatrix} c_1 \\ c_2 \\ c_3 \\ c_4 \\ c_5 \end{pmatrix} \qquad (2)$$

In the above formula (2), the reference numerals c1, c2, c3, c4, and c5($c_i$) show the measurement results of the respective light pulses by the measurement unit 3. The reference numerals f1, f2, f3, f4, and f5($f_i$) denote the result of calculating the interaction, respectively. The matrix calculation parameters $J_{12}, J_{13}, J_{14}, J_{15}, \ldots J_{53}, J_{54}$ denote the coupling coefficients mapped on the Ising model that are determined depending on a problem for which a solution is calculated. The following section will describe a case where the number of sites is 5. However, the size of a square matrix is determined depending on the number of the sites. The square matrix has a size determined by (the number of the sites)×(the number of the sites).

The above interaction can be determined, where assuming that the number of the sites (the number of light pulses constituting the light pulse train) is N, by allowing the calculator 4 to calculate the matrix based on the following formula (3).

Formula 13

$$\begin{pmatrix} f_1 \\ f_2 \\ f_3 \\ f_4 \\ \vdots \\ f_{N-1} \\ f_N \end{pmatrix} = \qquad (3)$$

$$\begin{pmatrix} 0 & J_{12} & J_{13} & J_{14} & \cdots & J_{1(N-1)} & J_{1N} \\ J_{21} & 0 & J_{23} & J_{24} & \cdots & J_{2(N-1)} & J_{2N} \\ J_{31} & J_{32} & 0 & J_{34} & \cdots & J_{3(N-1)} & J_{3N} \\ J_{41} & J_{42} & J_{43} & 0 & \cdots & J_{4(N-1)} & J_{4N} \\ \vdots & \vdots & \vdots & \vdots & \ddots & J_{5(N-1)} & \vdots \\ J_{(N-1)1} & J_{(N-1)2} & J_{(N-1)3} & J_{(N-1)4} & \cdots & 0 & J_{(N-1)N} \\ J_{N1} & J_{N2} & J_{N3} & J_{N4} & \cdots & J_{N(N-1)} & 0 \end{pmatrix} \begin{pmatrix} c_1 \\ c_2 \\ c_3 \\ c_4 \\ \vdots \\ c_{N-1} \\ c_N \end{pmatrix}$$

As shown in the above formulae (2) and (3), the calculator 4 generates a column vector including the measurement result by the measurement unit 3 as elements. The generated column vector can be multiplied with the matrix, thereby determining the interaction.

The external light pulse input unit 5 uses the calculation result obtained by calculating the phase and the amplitude of the light pulse measured only for the specific components of the phase and the amplitude to control the amplitude and the phase of the light pulse superposed with the light pulse within the ring resonator 1. This consequently provides the setting of the magnitude of the interaction and the symbol related to the light pulse. The external light pulse input unit 5 may be configured by a laser that controls the amplitude and the phase of the light pulse to output the result for example. The calculation result includes specific components of the phase and the amplitude only, thus providing the interaction of the specific components of the phase and the amplitude only.

Specifically, the external light pulse input unit 5 multiplexes a certain light pulse train with the same frequency as that of the light pulse train within the ring resonator 1 so that the light pulse train is synchronized with an amplitude and a phase proportional to the calculation result by the calculator 4. For example, the external light pulse input unit 5 can input an external pulse having a fixed frequency in a synchronized manner to thereby input a pulse having the frequency matched with that of the light pulse train within the ring resonator 1 in a synchronized manner. The light pulse train within the ring resonator 1 can be multiplexed with the external pulse depending on the calculation result to thereby provide a pseudo interaction to the light pulse train within the ring resonator 1.

According to the configuration to allow the external light pulse input unit 5 to provide a feedback input as described above, the component $c_i$ of the ith light pulse, the resonator lap number n, the ratio K of the external pulse are used to represent the light pulse train signal $c_i'(n)$ after the feedback by the formula (4) shown below.

Formula 14

$$c_i'(n) = c_i(n) + K f_i(n) \qquad (4)$$

The above formula shows that the light pulse train ci(n) within the ring resonator 1 is multiplexed, with a coupling ratio K, with the external light pulse train (a component use as a feedback input) provided by the external light pulse input unit 5.

$$\sum_{j}^{N} J_{ij} c_j(n) \qquad \text{Formula 15}$$

The multiplexing operation results in the light pulse train $c_i'(n)$ after the feedback.

When the light pulse train $c_i'(n)$ shown by the above formula is inputted again to the PSA 2, then the light pulse train $c_i'(n)$ is amplified to result in the light pulse train $c_i(n+1)$. The configuration as described above allows the Ising model calculation device to provide, through the repeated amplification and feedback, the light pulse train having a stable state depending on the problem.

Figure 6:
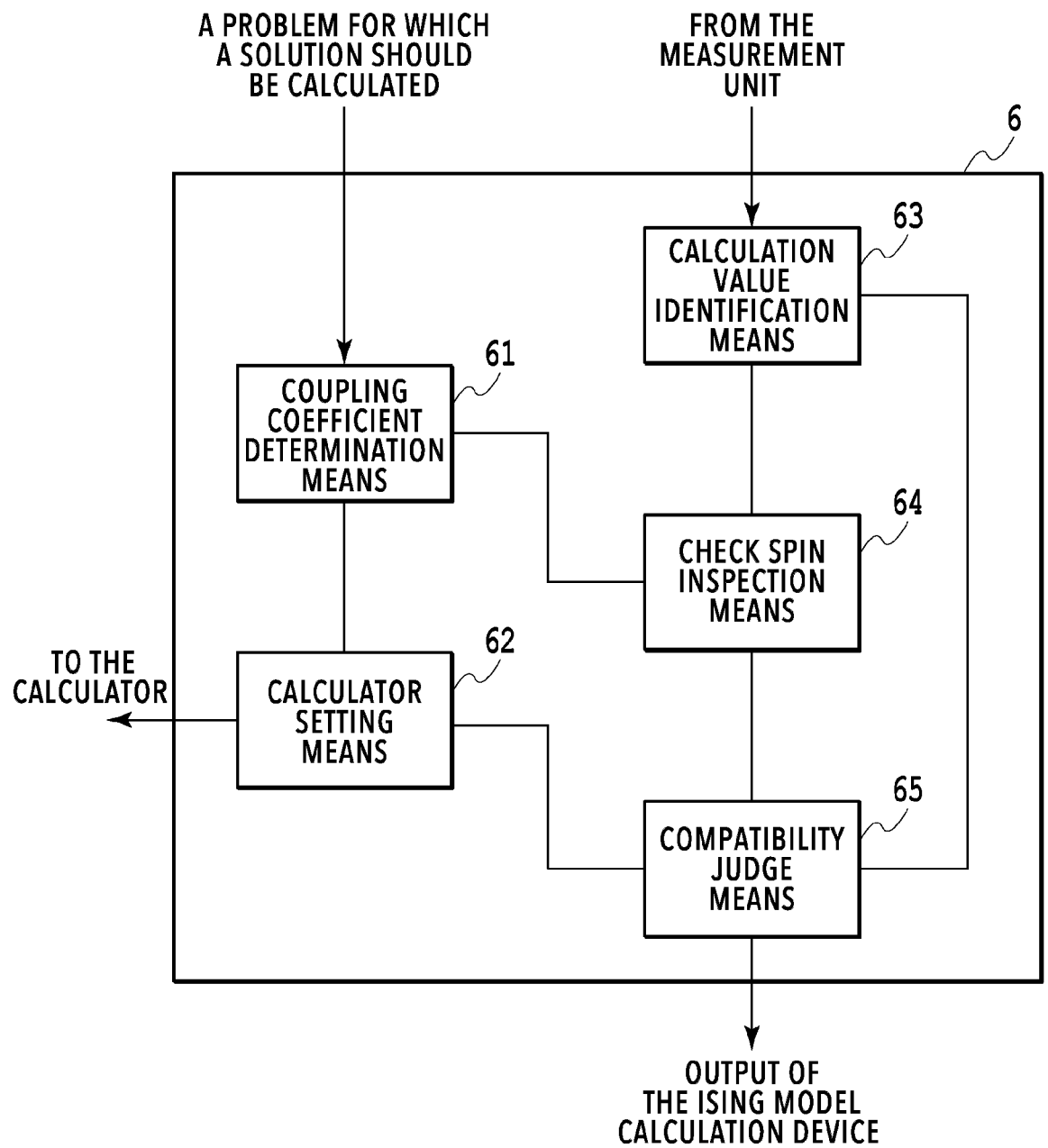
FIG. 6 illustrates an example of the configuration of a solution quality retention unit.

FIG. 6 illustrates one example of the configuration of a solution quality retention unit 6 using the check spin. The Ising model calculation device of this embodiment includes, in addition to the configuration to calculate the Ising model as descried above, the solution quality retention unit 6 to use a check spin to retain the solution quality. The solution quality retention unit 6 may be configured by a calculation processing means such as a computer including a processor or a memory for example. As shown in FIG. 6, the solution quality retention unit 6 has: a coupling coefficient determination means 61; a calculator setting means 62; a calculation value identification means 63; a check spin inspection means 64; and a compatibility judge means 65.

The coupling coefficient determination means 61 determines a coupling coefficient depending on a problem for which a solution should be calculated and further determines, in order to examine the calculation precision, a coupling coefficient depending on a check problem for which the solution is known.

The calculator setting means 62 sets, in the calculator 4, the coupling coefficient $J_{ij}$ obtained by combining a coupling coefficient depending on a problem for which a solution should be calculated determined by the coupling coefficient determination means 61 with a coupling coefficient corresponding to a check problem. In the above description, the formula (2) and the formula (3) are set to have the coupling coefficient $J_{ij}$ based on this combination.

Figure 7:
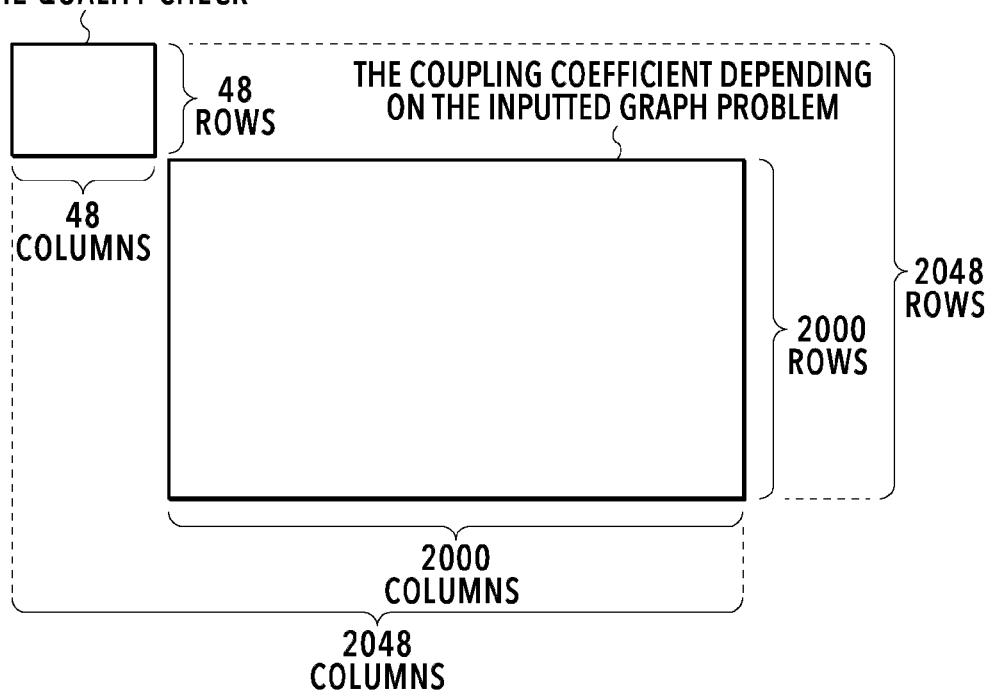
FIG. 7 illustrates $J_{ij}$ set by a calculator setting means.

FIG. 7 illustrates $J_{ij}$ set by the calculator setting means 62. As shown in FIG. 7, the calculator setting means 62 sets the matrix $J_{ij}$ in which the upper-left part of 48 rows×48 columns of the matrix constituting a part of the coupling coefficient is used as a coupling coefficient depending on the check problem and the lower-right part of 2000 rows×2000 columns of the matrix is used as a coupling coefficient depending on a problem for which a solution should be calculated. The coupling coefficient of the check problem is calculated using the check spin of FIG. 2. The coupling coefficient of the problem for which a solution should be calculated is calculated using the spins of FIG. 2 to calculate the inputted problem. When $J_{ij}$ is set in the calculator 4 by the calculator setting means 62, the PSA 2 of the Ising model calculation device receives pump light, thereby starting the calculation.

The calculation value identification means 63 identifies, when the light pulse train is set in a stable state, a solution (calculation value) based on the measurement value obtained by the measurement unit 3. The identified solution includes both of a solution corresponding to a to-be-calculated problem and a solution corresponding to the check problem.

The check spin inspection means 64 compares the solution of a part of the identified solution (calculation value) corresponding to of the check problem with (a solution obtained by using the check spin) and an already-found solution of the check problem to inspect how much the former and the latter are matched.

The compatibility judge means 65 judges, based on the result of inspecting the solution corresponding to the check spin, whether the resultant solution has a quality satisfying a quality reference or not. Whether the quality reference is satisfied or not is judged based on whether or not the number (probability) at which the solution corresponding to the check spin is matched with the known solution of the check problem is equal to or higher than the threshold value. When the judgement result shows that the quality reference is satisfied, then a part of the resultant solution corresponding to a to-be-calculated problem is adopted as a solution and is outputted as a solution by the Ising model calculation device. When the judgement result shows that the quality reference is not satisfied on the other hand, then the resultant solution is not adopted and the calculator setting means 62 is instructed again to set $J_{ij}$.

Figure 8:
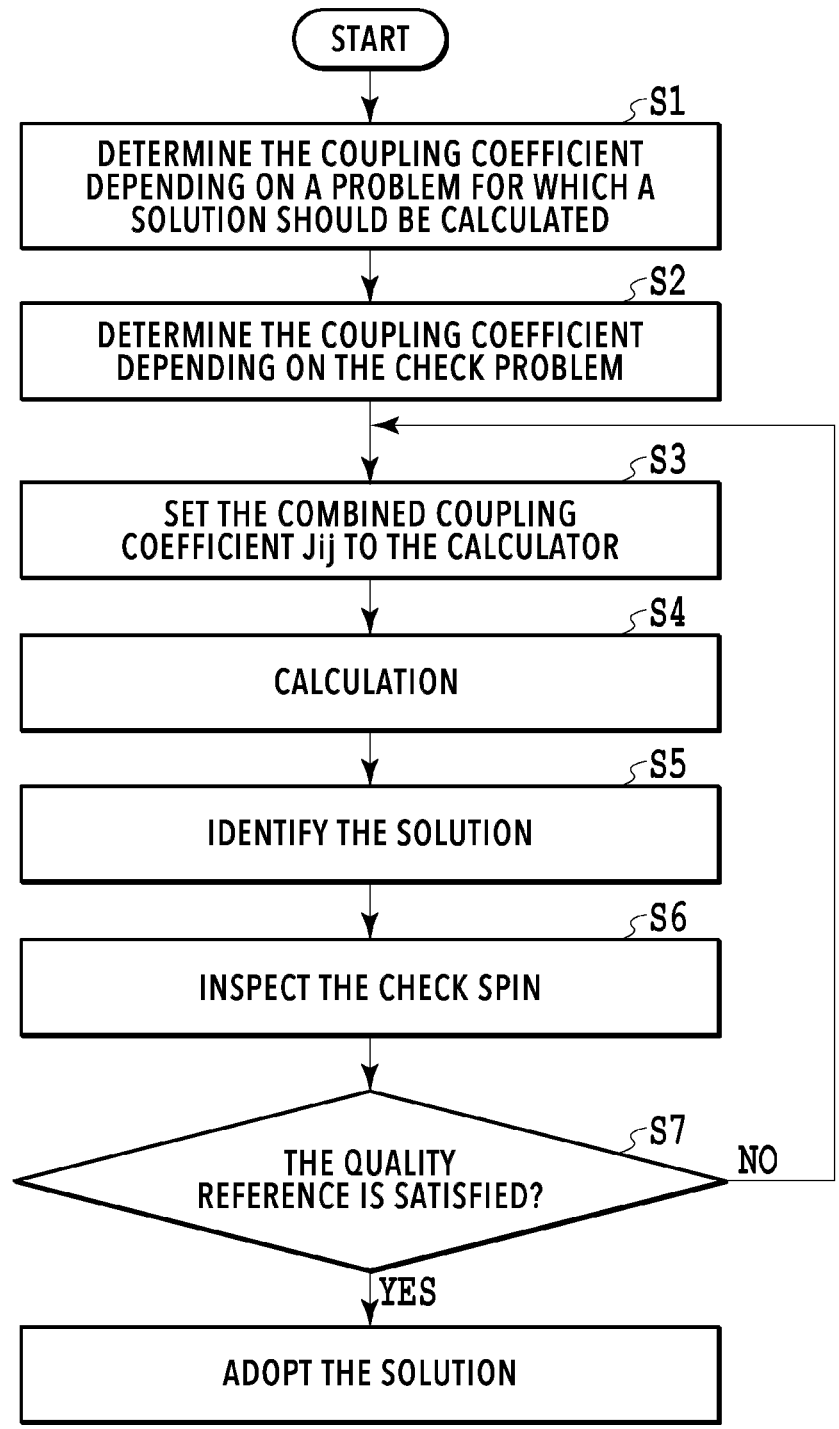
FIG. 8 illustrates the entire processing flow diagram in the Ising model calculation device of this embodiment.
Figure 9:
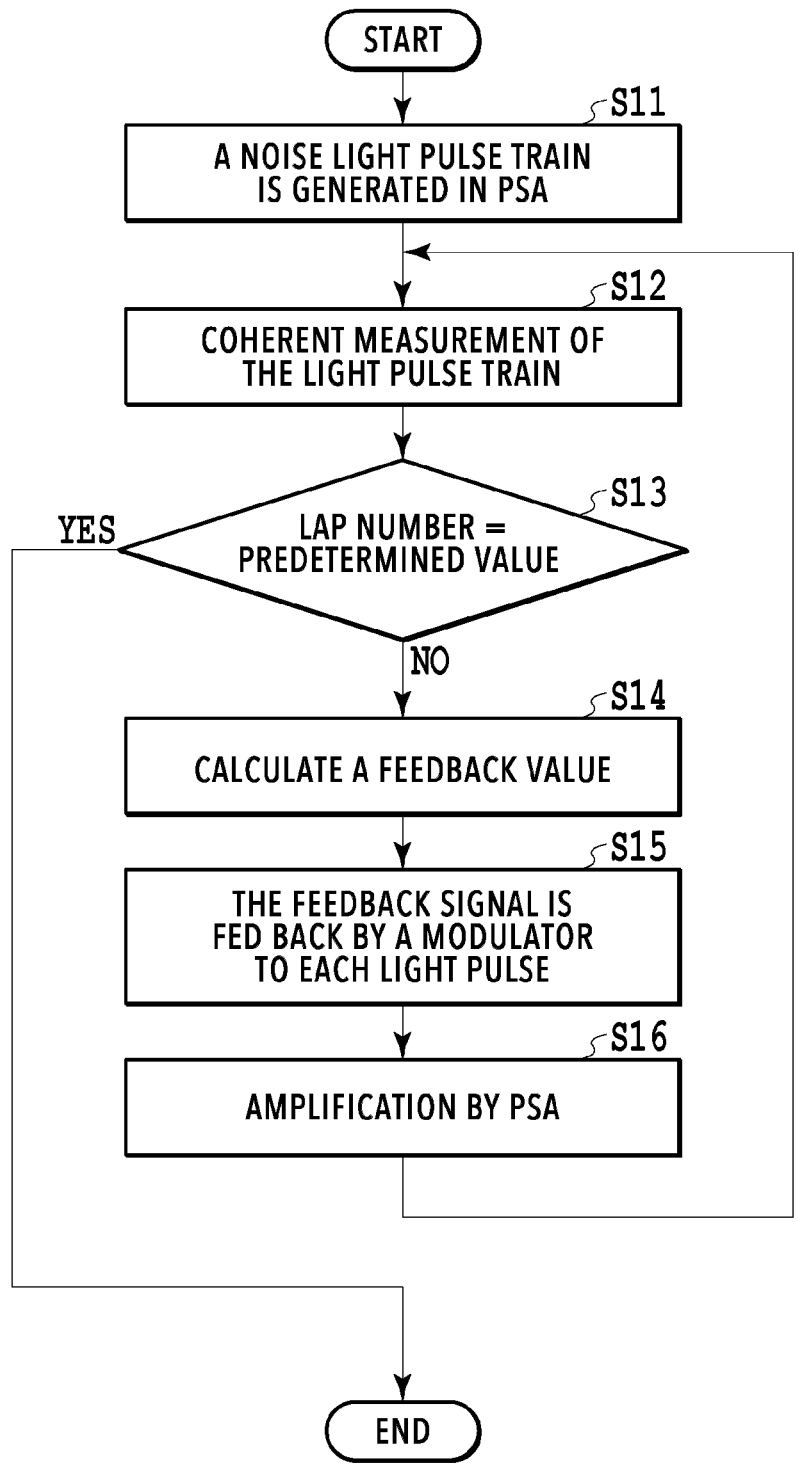
FIG. 9 is a processing flow diagram of the Ising model calculation device.

FIG. 8 illustrates the entire processing flow in the Ising model calculation device of this embodiment. FIG. 9 is a flow diagram illustrating a processing to calculate an Ising model. As shown in FIG. 8, the Ising model calculation device of this embodiment has a configuration in which, upon receiving a problem for which a solution should be calculated, the coupling coefficient determination means 61 determines a coupling coefficient depending on a problem (S1) and determines a coupling coefficient depending on a check problem (S2). Next, the coupling coefficient $J_{ij}$ obtained by combining the two coupling coefficients determined by the calculator setting means 62 is set in the calculator 4 (S3). When the coupling coefficient $J_{ij}$ based on the combination is set in the calculator 4, then pump light is inputted to the PSA 2 of the Ising model calculation device, thereby starting the calculation based on the processing flow shown in FIG. 9 (S4).

According to the calculation processing by the Ising model calculation device, the coupling coefficient $J_{ij}$ based on the combination in S3 is set and pump light is firstly inputted to the PSA 2. Then, a weak noise light pulse train is generated (S11), and the generated noise light pulse train moves around within the ring resonator 1. A part of the noise light pulse train moving around within the ring resonator 1 is divided and the amplitude and the phase of the divided part are coherently measured by the measurement unit 3 (S12).

When the measurement result of the light pulse train is obtained, the calculator 4 calculates a feedback value based on the matrix on which the coupling coefficient is mapped (S14).

Upon receiving the calculation result by the calculator 4, the external light pulse input unit 5 inputs, to the ring resonator 1, an external light pulse having a phase and an amplitude depending on the calculation result to multiplex the external light pulse with the light pulse train within the ring resonator 1, thereby sending a feedback regarding the light pulse train (S15).

The light pulse train after the feedback is inputted again to the PSA 2 and is amplified by pump light synchronized with the light pulse train (S16) and the resultant light pulse train moves again around within the ring resonator 1. The light pulse train moving again around within the ring resonator 1 is again subjected to the coherent measurement, the matrix-based calculation, and the feedback depending on the calculation result.

When the light pulse train is subjected to the repeated amplification and feedback of a predetermined number of times (S13), then the light pulse train is allowed to have a stable state. The calculation value identification means 63 identifies the calculation result provided by the stable state (a value obtained by substituting 0 or $\pi$ showing the phase state of the measurement result provided through the measurement unit 3 with the spin $\sigma$ state ($\pm 1$) of the Ising model) (S5). The check spin inspection means 64 inspects whether any of the identified solutions matches with the solution of the check problem for which the solution corresponding to the check problem is already found (S6). As a result, the compatibility judge means 65 determines whether the quality reference is satisfied or not. If it is judged that the quality reference is satisfied, then the resultant solution is adopted and is outputted through the Ising model calculation device (S7:Yes). If it is judged that the quality reference is not satisfied, the compatibility judge means 65 instructs the calculator setting means 62 to set a coupling coefficient again (S7:No).

Another Embodiment of the Check Problem

In this embodiment, the coupling coefficient determination means 61 determines a coupling coefficient depending on a problem for which a solution should be calculated. The coupling coefficient determination means 61 adopts a check problem for which the solution is known as a check problem in order to examine the calculation precision, thereby determining a coupling coefficient depending on a check problem for which the solution is known. However, another check problem to examine the calculation precision may be used such as a problem having a bipartite structure (bipartite graph). The following section describe the configuration of the solution quality retention unit 6 using a check problem having a bipartite structure only with regard to parts different from those of the above configuration.

Figure 10:
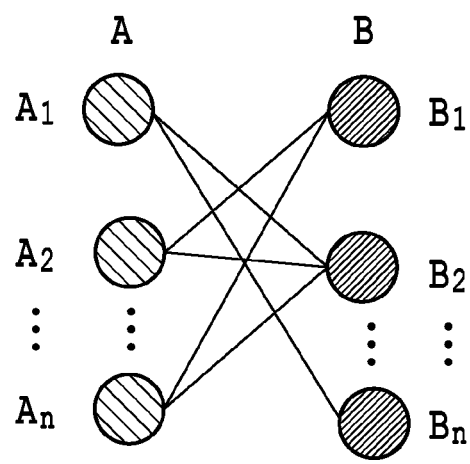
FIG. 10 illustrates a problem of a bipartite structure.
Figure 11:
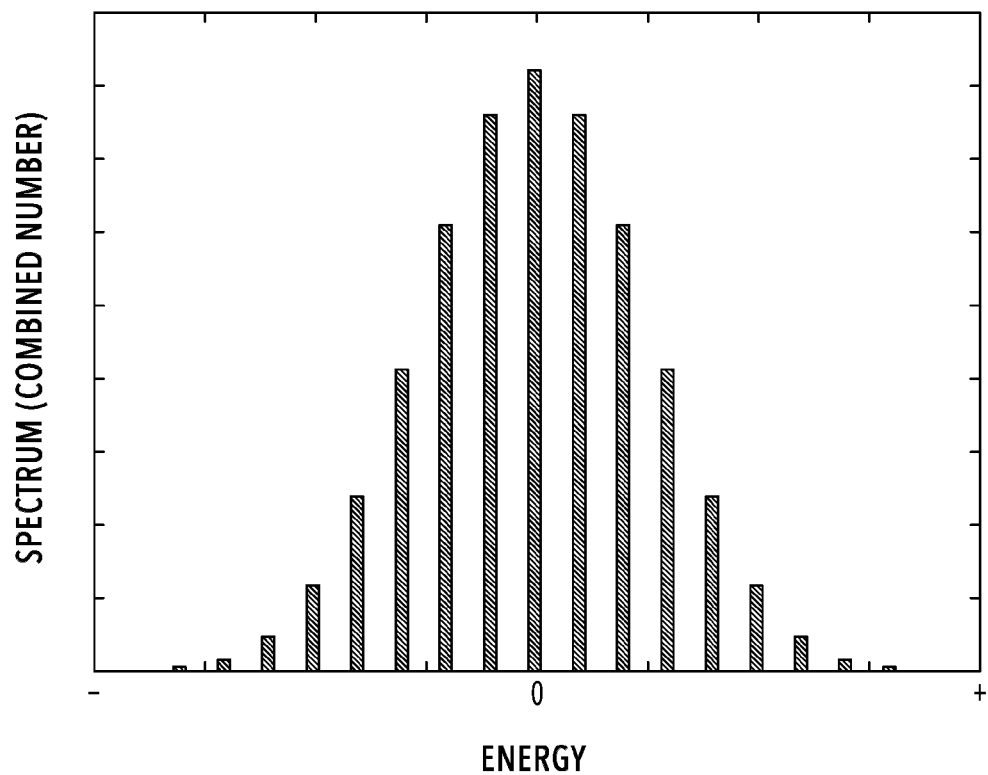
FIG. 11 illustrates the relation between the energy of the solution of the bipartite structure and combined numbers.
Figure 12:
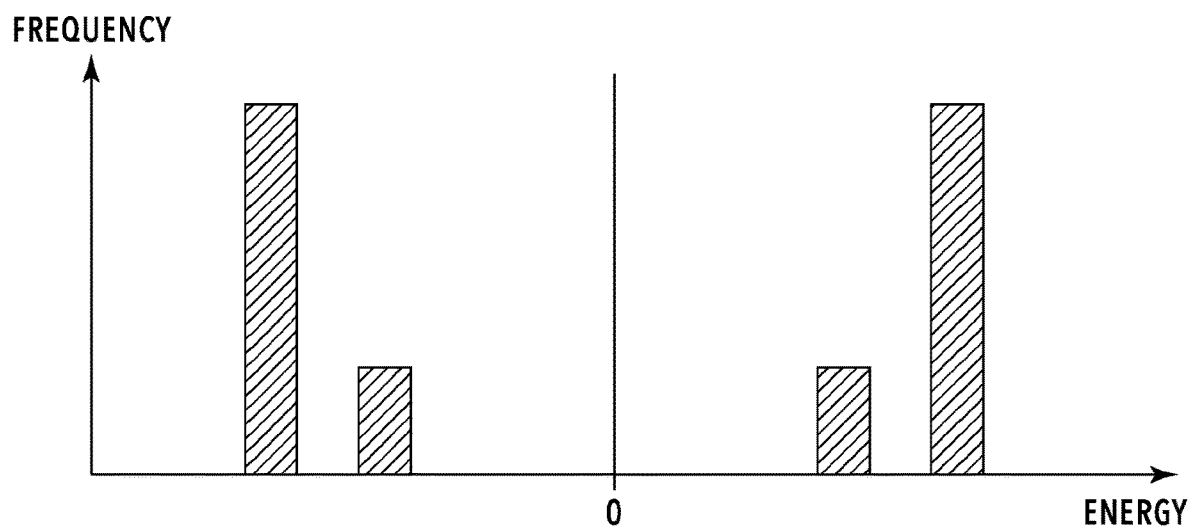
FIG. 12 illustrates the relation between the energy and the occurrence frequency of a solution obtained when a bipartite structure problem is calculated by the Ising model calculation device.

FIG. 10 illustrates a problem having a bipartite structure. FIG. 11 illustrates the relation between the energy of the problem of the bipartite structure and the combined number. FIG. 12 illustrates the relation between the energy and the occurrence frequency of the solution obtained when the problem of the bipartite structure is calculated by the Ising model calculation device. The bipartite structure is one embodiment of a graph theory. Specifically, as shown in FIG. 10, this is a graph structure in which, when arbitrary nodes divided to two subgraphs A and B (subsets) are connected by an edge, no edge exists between the same subgraphs. A problem is defined by the value of the weighting of the edge providing the connection between the respective nodes.

The Ising model calculation device provides an association between the value of each node of the problem of the bipartite structure and any of the value "+1" or "−1" of each node of the Ising model and provides an association between the coupling strength of edges providing the connection between nodes and an Ising model coupling coefficient. With regards to combinations of values that all nodes may have, the energy distribution of a problem having a target bipartite structure (i.e., the distribution of the total of the values of the solution) is calculated. The result is, as shown in FIG. 11, a symmetrical distribution surrounding the energy "0" at the center. As shown in FIG. 12, the occurrence frequencies of a solution having a predetermined energy by the Ising model calculation device is largely distributed at the maximum and minimum energy, resulting in being equal in the positive and negative directions to have "0" as a boundary.

The Ising model calculation device is originally designed to calculate a solution at which the minimum energy is achieved. As is clear from the solution occurrence frequency shown in FIG. 12, an incorrect solution is mainly caused by the phase shift of a light pulse to cause an inverted spin symbol (or an inverted symbol of a node value). Thus, according to this embodiment, the correctness of the calculation can be judged, based on the "0" energy of the solution to a problem of a bipartite structure as a boundary, by determining that the solution energy is lower than the "0" energy.

When the coupling coefficient determination means 61 determines a coupling coefficient depending on a check problem in order to examine the calculation precision, a problem having a bipartite structure can be represented based on the following matrix (5). In the following matrix (5), K means an arbitrary matrix and $K^t$ means a transposed matrix of K.

$$c_{ij} = \begin{bmatrix} 0 & \cdots & 0 & & & \\ \vdots & \ddots & \vdots & & K^t & \\ 0 & \cdots & 0 & & & \\ & & & 0 & \cdots & 0 \\ & K & & \vdots & \ddots & \vdots \\ & & & 0 & \cdots & 0 \end{bmatrix} \quad (5)$$

Specifically, the problem of a bipartite structure represented by the subgraph shown in FIG. 10 can be represented by the following formula (6) where assuming that the subgraph A has the respective nodes $A_1, A_2, A_3 \ldots$ and the subgraph B has the respective nodes $B_1, B_2, B_3 \ldots$, and the solution is $fa_1, fa_2, fa_3 \ldots fb_1, fb_2, fb_3 \ldots$.

$$\begin{pmatrix} fa_1 \\ fa_2 \\ fa_3 \\ \vdots \\ fb_1 \\ fb_2 \\ fb_3 \\ \vdots \end{pmatrix} = \begin{bmatrix} 0 & \cdots & 0 & & & \\ \vdots & \ddots & \vdots & & K^t & \\ 0 & \cdots & 0 & & & \\ & & & 0 & \cdots & 0 \\ & K & & \vdots & \ddots & \vdots \\ & & & 0 & \cdots & 0 \end{bmatrix} \begin{pmatrix} A_1 \\ A_2 \\ A_3 \\ \vdots \\ B_1 \\ B_2 \\ B_3 \\ \vdots \end{pmatrix} \quad (6)$$

Thus, when a problem having a bipartite structure is adopted as a check problem, the respective elements of the above matrix (5) is determined by the coupling coefficient determination means 61 as a coupling coefficient depending on a check problem. The determined coupling coefficient may be set by the calculator setting means 62 as a coupling coefficient depending on a check problem as shown in FIG. 7. When a problem having a bipartite structure is adopted as a check problem, the calculator setting means 62 sets a problem for which a solution should be calculated to the part of the coupling coefficient depending on the inputted graph problem of FIG. 7.

As described above, when a problem having a bipartite structure is adopted as a check problem, the check spin inspection means 64 identifies the energy of the solution of a part corresponding to the check problem of the solution identified by the calculation value identification means 63.

The compatibility judge means 65 judges that the quality reference is satisfied when the energy of the solution identified by the check spin inspection means 64 is "0" or less (or lower than "0") as a threshold value in which the energy of the solution is "0".

As described above, the check spin inspection means 64 is configured to identify the energy of the solution of the check problem instead of checking the matching with the solution of the check problem. Furthermore, the compatibility judge means 65 can judge that the quality reference is satisfied by determining that the energy of the solution of the check problem is "0" or less (or lower than "0") instead of determining that the probability of the matching of the solution of the check problem is equal to or higher than a threshold value. This can consequently provide, even when a problem having a bipartite structure is adopted as a check problem, a processing based on the processing flow shown in FIG. 8.

In this embodiment, an example was described in which the Ising model calculation device was composed of the ring resonator 1, the PSA 2, the measurement unit 3, the calculator 4, and the external light pulse input unit 5. However, the configuration of the Ising model calculation device is not limited to this.

In this embodiment, an example is merely shown for the relation shown in FIG. 2 between the check spin and the spin to solve the inputted problem and the relation shown in FIG. 7 between a coupling coefficient depending on a graph problem for the quality check and a coupling coefficient depending on the inputted graph problem (a problem for which a solution should be calculated). Which spin among all spins of the Ising model is used as a check spin (or which spin is used as a spin to solve the inputted problem) is not particularly limited. An arbitrary number of spins at an arbitrary position can be adopted. The coupling coefficient of the matrix of the calculator 4 is also not limited to the coupling coefficient of the upper-left 48 rows×48 columns as shown in FIG. 7. Thus, an arbitrary number of coupling coefficients at an arbitrary position can be set as a coupling coefficient depending on the graph problem for the quality check and the rest can be set as a coupling coefficient depending on the inputted graph problem (a problem for which a solution should be calculated).

The invention claimed is:

1. An Ising model calculation device including a resonator unit for amplifying a plurality of light pulses and a feedback configuration for measuring phases and amplitudes of the plurality of light pulses to calculate the interaction related to a light pulse using an Ising model coupling coefficient to send a feedback, comprising:
  a check spin introduction unit for using a part of the plurality of light pulses as a check spin to solve a check problem to examine the precision of the calculation, wherein the check spin introduction unit is configured to:
    set a coupling coefficient obtained by combining the Ising model coupling coefficient corresponding to a problem for which a solution should be calculated with the Ising model coupling coefficient corresponding to the check problem as a coupling coefficient used to calculate the interaction;
    judge, with regard to a calculation value corresponding to the check spin among calculation values calculated using the plurality of light pulses, the compatibility of the solution of the check problem;
    output, when the judgement result shows that the calculation value is compatible as a solution of the check problem, a calculation value other than the calculation values corresponding to the check spin among the resultant calculation values as a solution to the problem for which a solution should be calculated; and
    set, when the judgement result shows that the calculation value is not compatible as a solution of the check problem, the combined coupling coefficient again as a coupling coefficient used to calculate the interaction to perform the calculation.

2. The Ising model calculation device according to claim 1, wherein the resonator unit includes a phase sensitive amplifier for causing the parametric oscillation with a phase 0 or $\pi$ to a plurality of light pulses pseudoly corresponding to a plurality of spins of the Ising model and having the same oscillatory frequency and a ring resonator for allowing the plurality of light pulses to move around therein, and
  the feedback configuration includes:
    a light pulse measurement unit for measuring, whenever the plurality of light pulses move around within the ring resonator, the phases and amplitudes of the plurality of light pulses;
    an interaction calculator for receiving information for the phases and amplitudes of the plurality of light pulses measured by the light pulse measurement unit and calculating the interaction related to a certain light pulse based on the Ising model coupling coefficient and the measured light pulse; and
    an interaction implementation unit for superposing, based on the interaction calculated by the interaction calculator, the light pulse by controlling the amplitude and the phase of the light pulse and implementing the interaction related to the certain light pulse determined based on the Ising model coupling coefficient and the measured phase and amplitude of the light pulse,
  wherein the light pulse measurement unit is configured, in a process of repeating a feedback loop control configured by the light pulse measurement unit, the interaction calculator, and the interaction implementation unit, to convert the phases of the plurality of light pulses measured after the plurality of light pulses have a stable state to spins of the Ising model to obtain the values of the spins of the Ising model.

3. The Ising model calculation device according to claim 2, wherein the interaction calculator is configured to multiply, when m measured light pulses among M measured light pulses are used as a check spin, the m light pulses among the M light pulses with a matrix having a coupling coefficient corresponding to the check problem as a calculation parameter to calculate the elements of the resultant column vector as the interaction related to the certain m light pulses corresponding to the m light pulses, and
  multiply, with regard to N light pulses among the measure M light pulses (when assuming that "m" and "M" are a natural number, "N" is an integer satisfying N=M−m), light pulses having phases and amplitudes represented by a column vector having elements $c_0, c_1, c_2, c_3, c_4, \ldots c_i \ldots c_{N-1}, c_N$ with a matrix shown below having an Ising model coupling coefficient as a calculation parameter to calculate elements $f_1, f_2, f_3, f_4, \ldots f_i \ldots f_{N-1}, f_N$ of the resultant column vector as the interaction related to the N light pulses corresponding to the N light pulses Formula 16

$$\begin{pmatrix} f_1 \\ f_2 \\ f_3 \\ f_4 \\ \vdots \\ f_{N-1} \\ f_N \end{pmatrix} = \begin{pmatrix} 0 & J_{12} & J_{13} & J_{14} & \cdots & J_{1(N-1)} & J_{1N} \\ J_{21} & 0 & J_{23} & J_{24} & \cdots & J_{2(N-1)} & J_{2N} \\ J_{31} & J_{32} & 0 & J_{34} & \cdots & J_{3(N-1)} & J_{3N} \\ J_{41} & J_{42} & J_{43} & 0 & \cdots & J_{4(N-1)} & J_{4N} \\ \vdots & \vdots & \vdots & \vdots & \ddots & J_{5(N-1)} & \vdots \\ J_{(N-1)1} & J_{(N-1)2} & J_{(N-1)3} & J_{(N-1)4} & \cdots & 0 & J_{(N-1)N} \\ J_{N1} & J_{N2} & J_{N3} & J_{N4} & \cdots & J_{N(N-1)} & 0 \end{pmatrix} \begin{pmatrix} c_1 \\ c_2 \\ c_3 \\ c_4 \\ \vdots \\ c_{N-1} \\ c_N \end{pmatrix}$$

4. The Ising model calculation device according to claim 1, wherein the check problem is a check problem for which the solution is known.

5. The Ising model calculation device according to claim 1, wherein the check problem is a problem having a bipartite structure.

\* \* \* \* \*